United States Patent [19]
Merz et al.

[11] 3,872,217
[45] Mar. 18, 1975

[54] PROCESS FOR THE MANUFACTURE OF SUBSTANTIALLY SPHERICAL, SILICA-CONTAINING HYDROGELS

[75] Inventors: Gerhard Merz, Frankenthal; Heinz Gehrig, Buerstadt; Wilhelm Chorbacher, Neustadt, all of Germany

[73] Assignee: Badische Anilin- & Soda-Fabrik Aktiengesellschaft, Ludwigshafen/Rhine, Germany

[22] Filed: Jan. 24, 1972

[21] Appl. No.: 220,142

[52] U.S. Cl.............. 423/338, 423/335, 423/659, 23/283
[51] Int. Cl............................................. C01b 33/16
[58] Field of Search .......... 423/338, 335, 613, 659, 423/473; 23/182 R

[56] References Cited
UNITED STATES PATENTS

| | | | |
|---|---|---|---|
| 1,403,993 | 1/1922 | Wallace et al. | 423/473 |
| 1,773,273 | 8/1930 | Miller | 423/338 |
| 2,358,201 | 9/1944 | Behrman | 423/338 |
| 2,384,946 | 9/1945 | Marisic | 423/335 X |
| 3,161,468 | 12/1964 | Walsh | 423/335 |
| 3,243,262 | 3/1966 | Carr et al. | 423/338 |
| 3,313,739 | 4/1967 | Acker et al. | 423/338 X |
| 3,416,892 | 12/1968 | Hitzemann et al. | 423/613 |
| 3,464,792 | 9/1969 | Herrimen et al. | 423/613 |
| 3,526,603 | 9/1970 | Acher | 423/338 X |
| 3,540,853 | 11/1970 | Kulling et al. | 423/613 X |

FOREIGN PATENTS OR APPLICATIONS

559,450    6/1958    Canada .............................. 423/338

OTHER PUBLICATIONS

John H. Perry's "Chem. Engineers' Handbook," Third Ed., p. 1203 (1950 Ed.), McGraw-Hill Book Co., Inc., New York.

*Primary Examiner*—Edward Stern
*Attorney, Agent, or Firm*—Johnston, Keil, Thompson & Shurtleff

[57] ABSTRACT

Substantially spherical, silica-containing hydrogels are prepared by spraying droplets of silica hydrosols (obtained by reacting alkaline silica-containing raw materials with acidic solutions) into a gaseous medium and allowing the droplets to solidify while falling freely. The reaction for the formation of silica hydrosol is carried out by introducing the acidic solution at the upstream end of a continuous-flow mixing zone and adding the silica-containing raw material at a series of points distributed along the downstream path.

6 Claims, 1 Drawing Figure

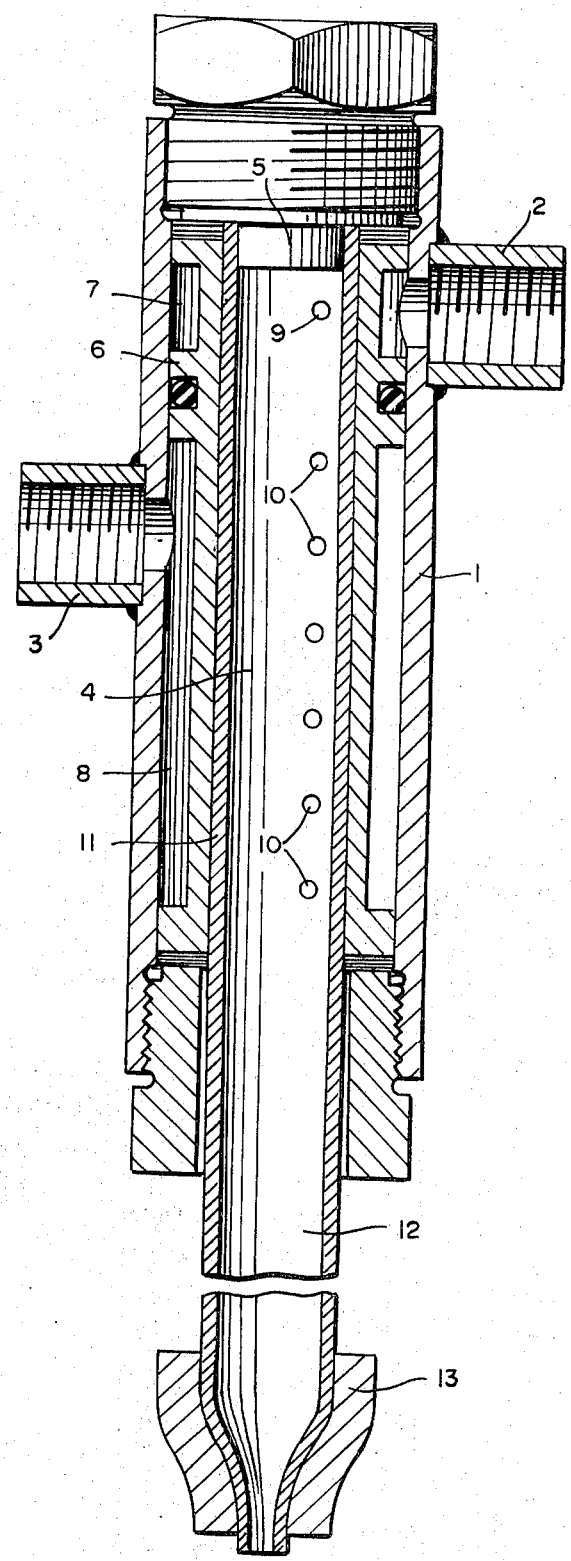

PROCESS FOR THE MANUFACTURE OF SUBSTANTIALLY SPHERICAL, SILICA-CONTAINING HYDROGELS

The present invention relates to a process and apparatus for the manufacture of substantially spherical, silica-containing hydrogel.

Silica-containing hydrogels have a plurality of applications. Specifically for example, they are valuable intermediates in the preparation of highly concentrated, stable silica hydrosols or they may be dried to form silica gels having small or large pores depending on treatment. The known uses of fine-pore silica gel include commercial gas drying operations where silica gel is employed in the form of lumps or spheres. Coarse-pored silica gel is used in large quantities in a finely ground form as a delustring agent for varnishes, as an antiblocking agent for plastics sheeting, as stabilizer for beer and for a large number of other purposes. Silica hydrogel is also used in the preparation of catalysts.

On account of this large number of applications, it is particularly desirable to produce silica hydrogel in a simple manner and in an easily handled form, for example as spheres, whilst it is advantageous, due to the wide variety of applications, to avoid preparing the silica hydrogel by a process which provides an impure product.

It is known from German Patent No. 896,189 that spherical silica hydrogels may be manufactured by producing a gel-forming silica hydrosol by reacting a silica-containing raw material such as water glass with an acid such as sulfuric acid and passing said hydrosol through a gaseous or liquid medium (e.g. petroleum) not miscible with water and the hydrosol. The drops of hydrosol assume a substantially spherical shape and remain in the oily medium until the sol has been converted to solid hydrogel. The hydrogel spheres prepared by this method generally contain only about 10% by weight of $SiO_2$. Owing to their expensive mode of manufacture and their contamination with petroleum, they are almost exclusively converted to beads for drying industrial gases. When, in said process, the mixture is sprayed into a gaseous medium, the procedure is to pass water glass, sulfuric acid and aluminum sulfate to a mixing nozzle from which hydrosol droplets containing about 10% by weight of silica and alumina are sprayed into a vessel filled with air. Under the conditions used, the hydrosol is converted to hydrogel within one second with the result that the small droplets of hydrogel may be collected in a layer of water at the bottom of the vessel and then removed for further processing.

The extremely rapid conversion from hydrosol to hydrogel required in this method is very difficult to maintain over long periods, as incrustation soon occurs in the mixing chamber and at the orifice of the nozzle due to the reaction conditions necessary in such a process, and such incrustation cannot be obviated by using very short residence times or by employing vigorous mixing techniques in the mixing chamber. This makes it very difficult or almost impossible to achieve steady state conditions. Moreover, it is not possible, using this method, to produce over long periods hydrogel spheres which show perfectly homogeneous blending of their components and which can be converted by appropriate methods to spherical fine-pore silica gel. The manufacture of spherical hydrogels in gaseous medium has not therefore been adopted in industry.

Thus it is understandable that industrial processes used at the present time largely comprise methods of producing non-contaminated silica hydrogel containing up to 15% by weight of $SiO_2$, in lump form. In such methods, the unstable silica hydrosol is allowed to solidify to the hydrogel and the resulting compact hydrogel is then broken up into lumps. It is often necessary for the water glass and sulfuric acid used as starting materials and the resulting silica hydrosol to be cooled to from 5° to 10°C. Moreover, the apparatus used for breaking the hydrogel up into small lumps is highly complicated and very expensive.

It is an object of the present invention to provide a process for producing substantially spherical, silica-containing hydrogels from silica hydrosols obtained by reacting alkaline silica-containing raw materials with acidic solutions, in which the silica hydrosols are formed into drops in a gaseous medium and solidified to a spherical hydrogel which is washed, optionally after intermediate aging and/or base exchange, and in which the drawbacks of the prior art process are avoided.

We have found that his object is achieved by forming the silica hydrosol by feeding the acidic solution to the upstream end of a continuous-flow mixing zone and then adding the silica-containing raw material to the acidic solution at various points distributed along the downstream path.

It is an important characteristic feature of the process of the invention that the components used for forming the silica hydrosol are brought together not just before the mixture is sprayed for the the purpose of converting the sol to droplets but in a mixing zone which they pass through before spraying. Another important feature of the method of the invention is that the acidic solution is first of all fed to the upstream end of the mixing zone and the silica-containing raw material is then added thereto in the required dosage as the acidic solution passes down through the mixing zone, the partial streams of silica-containing raw material being introduced at graded rates at various mixing points distributed along the axis of the mixing zone, or alternatively, the addition of the silica-containing raw material is effected over the entire length of the mixing zone without spatial discontinuations. In this way the sulfuric acid is reacted with a part of the water glass to form initially an acidic hydrosol, local alkaline reactions being avoided and the neutralization of the well mixed acidic hydrosol being gradually completed toward the downstream end of the mixing zone, it being essential that no back-mixing occurs.

The two components are preferably introduced into the mixing zone so as to perform spiral motion therein, this being effected by feeding the components tangentially to the usually cylindrical mixing zone. The directions of tangential feed may be the same at all mixing levels or they may alternate. Alternating directions of tangential feed provide somewhat better mixing due to the higher relative velocities but they tend to produce higher local residence times which are associated with the risk of back-mixing and blockage or incrustation. To avoid these dangers, it is preferred to introduce the components into the mixing zone in the same tangential direction.

Particularly suitable silica-containing raw materials are water glass of sodium or potassium containing for example from 10 to 20% by weight of $SiO_2$ and optionally containing minor portions of, say, the product gel in solution or suspension. Suitable acidic solutions are dilute mineral acids, particularly dilute sulfuric acid having a concentration of from 20 to 35% by weight. It is another advantage of our process that it is possible to use the reactants in concentrations near the upper limit of the specified ranges and thus obtain homogeneous hydrogels having contents of up to 18% by weight of $SiO_2$ if the temperature in the mixing zone does not exceed 45°C. When the water glass and sulfuric acid used are cooled to, say, about 10°C, it is even possible to produce glass-clear hydrogel spheres having an $SiO_2$ content of more than 18 to about 23% by weight. Depending on the $SiO_2$ content required in the hydrogel, it is thus possible to use temperatures of from 5° to 45°C. At low concentrations of the two starting materials it is advantageous to select relatively high temperatures within the range stated.

The two components are fed to the mixing zone in such proportions that the silica hydrosol formed in the mixing zone reaches a pH of from 5 to 10 and preferably from 7 to 9. Within this range, lower PH's are advantageously used for higher concentrations of the components and higher temperatures.

The process of the invention is described below with reference to the accompanying drawing in which an apparatus suitable for carrying out the process of the invention is illustrated.

The outer casing 1, which is preferably cylindrical, is provided with an inlet 2 for the acidic solution and an inlet 3 for the silica-containing raw material, said inlets being in staggered relationship to each other along the length of casing 1. Within the latter there is provided a mixing chamber 4, which is preferably coaxial with casing 1. The mixing chamber is closed at its upstream end 5 and possesses a collar 6 which sealingly divides the space between casing 1 and the outer surface of mixing chamber 4 into two annular chambers 7 and 8, the point of said division being between inlets 2 and 3. It will be appreciated that the two reactants may be fed directly to the mixing chamber, if desired, instead of via the two annular chambers. The acidic solution flows from the first annular chamber 7 through one or, if desired, more than one bore or duct 9 into mixing chamber 4, said bores or ducts being preferably tangential to the mixing chamber. The silica-containing raw material passes from annular chamber 8 through a number of bores or ducts 10 into the mixing chamber, which bores or ducts 10 are located at different levels of the mixing chamber and are also preferably tangential thereto. If desired, the ducts 10 disposed at various levels may be replaced by a single tangential slot extending longitudinally of the mixing chamber, through which slot the silica-containing feedstock passes into the mixing chamber. When individual ducts 10 are provided, the silica-feedstock is added to the acidic solution in doses, whilst in the case of a slot extending over the length of the mixing zone the addition of silica occurs continuously, i.e. without spatial discontinuations.

In principle, it is possible to position a nozzle immediately downstream of the last feed level, through which nozzle the hydrosol formed may be converted to droplets by spraying into a gaseous medium in which the hydrosol is not appreciably soluble, e.g. air. However, it has proved advantageous to allow the hydrosol formed to pass through a secondary mixing zone before it is sprayed, no further addition of silica-containing raw material being made in said secondary mixing zone. To this end, the mixing chamber contains a further housing, for example plastics tubing 11, which is provided with ports which register exactly with the aforementioned bores or ducts 9 and 10. Said tubing projects from the mixing zone at its downstream end by a distance approximetaly equal to the length of the mixing zone. Thus a secondary mixing chamber 12 is formed to which no silica-containing feedstock is fed. This construction provides an edgeless transition region between the mixing chamber 4 and the secondary mixing chamber 12 and thus effectively prevents the formation of incrustation in said region.

The nozzle or mouthpiece used for spraying the silica hydrosol formed into the gaseous medium is advantageously provided by placing a short tube 13 having, say, a flat, oval, reniform or similar crosssection over the downstream end of the tubing. This also obviates edges.

It has also been found advantageous to provide that part of the tubing which serves as secondary mixing chamber with a flat crosssection at one or more points in order to reduce the circumferential velocity components in favor of the axial components.

The apparatus may be adapted to suit the conditions, for example rates of flow, concentrations and temperatures of the starting materials by, say, selecting suitable dimensions for the mixing chamber and by selecting a suitable arrangement, number, shape and size of the ducts through which the reactants pass.

The 1/d ratio of the mixing chamber should advantageously be from 5:1 to 20:1. The length of the mixing chamber is usually approximately 50 to 200 mm.

The secondary mixing chamber, which conveniently has the same diameter as the primary mixing chamber, is advantageously such that residence times of from 0.01 to 0.1 second therein are possible. In view of the proposed rates of flow of the reactants, this means that the length of the secondary mixing chamber, i.e. the chamber to which no silica-containing raw material is fed, may be from about 100 to 300 mm.

To achieve satisfactory operation of the apparatus it is essential that no edges be present within the mixing chamber and at the various transition points, as these could cause the formation of incrustation.

The spherical silica hydrogel produced by the process of the present invention may be used without further treatment in all processes where it is not required to retain the spherical form. Thus these spherical silica hydrogels may be converted by usual methods to silica sols or coarse-pore silica gel.

If, however, it is desired to convert the hydrogel spheres to fine-pore silica gel suitable, for example, as desiccant, whilst retaining the spherical shape, the hydrogel spheres must be subjected in known manner to gel aging and base exchange before drying.

It has been found, surprisingly, that it is no longer necessary to maintain low temperatures of, say, 5°C when aging the hydrogel spheres produced by the process of the invention, in order to obtain, after subsequent drying, spherical fine-pore silica gel of high strength and good desiccating properties. Aging may, if desired, be advantageously carried out at higher temperatures, e.g. temperatures of from 15° to 30°C, aging times in this temperature range of from 5 to 120 minutes and preferably from 5 to 20 minutes being sufficient. Aging is followed by adicification, i.e. the hydrogel is treated with an acid solution, for example a dilute mineral acid which may also contain salt, for example sulfuric acid or nitric acid. The acids advantageously have a concentration of at least 0.8% by weight. No upper limit is set to the concentration of the acid, although concentrations of less than 25% by weight will be preferred for economical considerations. Acidification is advantageously carried out for from 0.5 to 3 hours. Following acidification, the hydrogel is rinsed in known manner, for example with weakly acidic water, and then dried at temperatures of from 100° to 130°C.

The above method of preparing spherical fine-pore silica gel for drying industrial gases is much simpler than previously known methods. The reduction of the aging period means that the relevant part of the plant may be considerably smaller. There is no need to effect measures for cooling the hydrogel during the aging process, as has hitherto been necessary. Moreover, the time required for acidification is only from 0.5 to 3 hours, whereas treatment times of more than 10 hours are not infrequent in the base exchange processes described in the literature. Finally, the hydrogel produced by the process of the present invention and treated with relatively strong acid may be more rapidly washed free of salt after said treatment.

EXAMPLE 1

A mixing nozzle of the kind illustrated in the drawing and having the following characteristics is used:

the diameter of the cylindrical mixing chamber of plastics tubing is 14 mm and the length of the mixing chamber (including the secondary mixing zone) is 350 mm. A tangential inlet bore of 4 mm in diameter is provided for the sulfuric acid feed near the closed inlet end of the mixing chamber. Four further bores, each having a diameter of 4 mm and arranged to admit the water glass in the same direction, are provided at intervals of 30 mm along the length of the mixing chamber. Thus the $l/d$ ratio of the primary mixing zone is about 10:1. That of the secondary mixing zone adjacent said primary mixing zone is 15:1. The spray nozzle is formed by pushing a flattened tube having a slightly reniform cross-section over the outlet end of the plastics tubing.

This mixing device is charged with 325 l/hr of 33% sulfuric acid at 20°C under a working pressure of about 2 atmospheres gage and with 1,100 l/hr of water glass (prepared from commercial water glass having 27% by weight of $SiO_2$ and 8% by weight of $Na_2O$ by dilution with water) having a specific gravity of 1.20 kg/l and a temperature also of 20°C under a pressure of approximately 2 atmospheres gage. In the mixing chamber lined with plastics tubing there is formed, by progressive neutralization, an unstable hydrosol having a pH of between 7 and 8 and this hydrosol resides in the secondary mixing zone for approximately a further 0.1 second to complete homogenization before it is sprayed from the nozzle into the atmosphere to form a fan-shaped jet. During its passage through the air, the jet of liquid breaks up into separate droplets which, due to surface tension, assume a substantially spherical shape and then solidify to hydrogel spheres within about 1 second while falling freely through the atmosphere. The spheres have a smooth surface, are glass-clear, contain about 17% by weight of $SiO_2$ and have the following particle size distribution:

more than 8 mm    10%
from 6 to 8 mm    45%
from 4 to 6 mm    34%
less than 4 mm    11%
these percentages being by weight.

It will be appreciated that the distribution of particle sizes may be varied as desired by using other types of nozzle.

The hydrogel spheres are collected in a washing tower which is almost full of hydrogel spheres and in which the spheres are immediately washed, without intermediate aging, with warm water (about 50°C) which has been made alkaline by the addition of ammonia, said washing being effected in a continuous countercurrent process to free the hydrogel spheres from salt.

The washed hydrogel spheres are dried at from 200° to 300°C and then milled. The resulting powder of coarse-pore silica gel has a specific surface area of from 300 to 350 m²/g and a specific pore volume of from 0.8 to 1.0 cm³/g and may be used for a wide variety of applications depending on its fineness.

EXAMPLE 2

Using the mixing nozzle described in Example 1, hydrogel spheres containing 15% of $SiO_2$ are made by the process of the invention from 32% w/w sulfuric acid and water glass having a density of 1.18. These hydrogel spheres are collected in neutral water at 20°C and left to age therein for from 5 to 10 minutes. The spherical hydrogel is then sifted to give a useful fraction having diameters between 6 and 8 mm, and also tailings and fines. The tailings and fines are converted to a powder of coarse-pore silica gel by the method described in Example 1, whilst the useful fraction is acidified for 1 hour using 5% w/w sulfuric acid at room temperature, after which the gel is washed free of salt at room temperature using water which has been weekly acidified with sulfuric acid and has a pH of 2. After drying at from 100° to 130°C in an atmosphere of steam for from 10 to 12 hours followed by activation at 250°C, there is obtained a hard silica gel consisting of more than 90% by weight of undamaged whole spheres and having the following properties:

| | |
|---|---|
| specific surface area | 805 m²/g |
| specific pore volume | 0.42 cm³/g |
| bulk density | 810 g/l |
| loss on ignition (900°C) | 6.0% by weight |
| particle size | 95% between 3 and 4 mm |

The isothermic equilibrium loading $\chi$ at 25°C is given below for various relative humidities $\phi$:

| $\chi$: | 20% | 40% | 60% | 80% |
|---|---|---|---|---|
| $\phi$: | 13.9% | 25.8% | 34.6% | 38.1%. |

We claim:
1. A process for forming substantially spherical, silica-containing hydrogels which comprises: feeding a dilute mineral acid to the upstream end of a continuous-flow mixing zone; adding waterglass of sodium or potassium to said dilute acid at various points distributed along the downstream path of said dilute acid at temperatures of from 5° to 45°C, the dilute acid and the waterglass being fed to the mixing zone in such an amount that the silica hydrosol formed in the mixing zone reaches a pH of from 5 to 10; and spraying said silica hydrosol into a gaseous medium to form droplets of hydrosol which solidity to a spherical silica hydrogel while freely falling, whereby said spherical silica hydrogel is formed without any substantial incrustation tak- ing place in the mixing zone chamber and in the orifice through which said reactant passes to said mixing zone apparatus.

2. A process as set forth in claim 1, wherein the acidic solution and/or the silica-containing raw material is or are introduced into the mixing zone tangentially.

3. A process as set forth in claim 1, wherein, when the acidic solution and the silica-containing raw material are both introduced tangentially, these components are caused to flow in the same spiral direction.

4. A process as set forth in claim 1, wherein the spherical silica hydrogel is aged for a period of from 5 to 120 minutes in aqueous solution at temperatures of from 15° to 30°C, the aged hydrogel then being treated with an acidic solution for from 30 to 180 minutes and then rinsed.

5. A process as set forth in claim 1 wherein the dilute mineral acid is sulfuric acid having a concentration of from 20 to 35% by weight.

6. A process as set forth in claim 1 wherein the water glass of sodium or potassium has a concentration of from 10 to 20% by weight.

* * * * *

UNITED STATES PATENT AND TRADEMARK OFFICE
CERTIFICATE OF CORRECTION

PATENT NO. : 3,872,217
DATED : March 18, 1975
INVENTOR(S) : MERZ et al

It is certified that error appears in the above-identified patent and that said Letters Patent are hereby corrected as shown below:

In the Heading, insert -- [30] Foreign Application Priority Data  January 25, 1971  Germany  P 21 03 243.9 --

Signed and Sealed this

Fifth Day of October 1976

[SEAL]

Attest:

RUTH C. MASON
*Attesting Officer*

C. MARSHALL DANN
*Commissioner of Patents and Trademarks*